United States Patent Office — 3,479,512, Patented Nov. 18, 1969

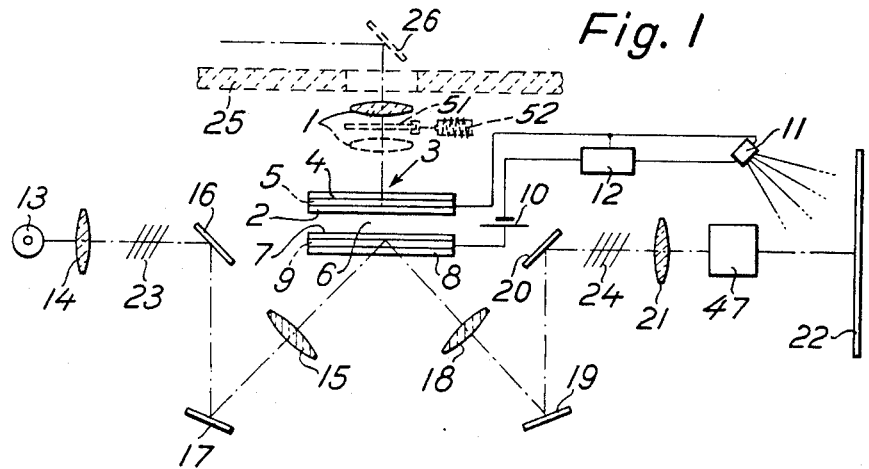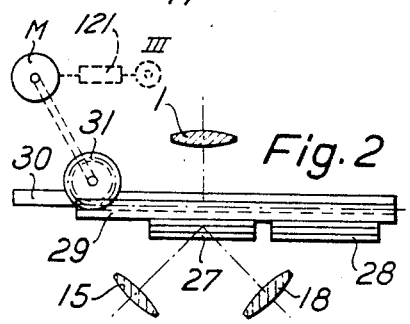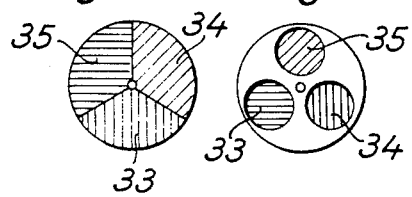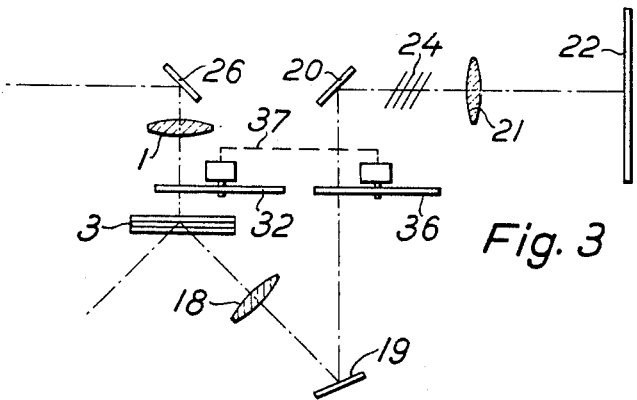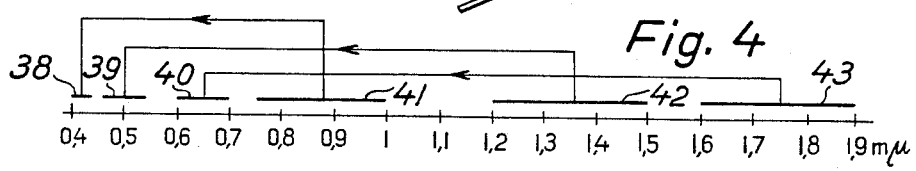

3,479,512
VIEWING AND OBSERVATION DEVICE
Gustav Weissenberg, Wetzlar, Germany, assignor to Ernst Leitz, Wetzlar, Germany, a corporation of Germany
Filed Nov. 14, 1966, Ser. No. 594,188
Claims priority, application Germany, Nov. 16, 1965, L 52,155
Int. Cl. G01j 1/20
U.S. Cl. 250—201   13 Claims

ABSTRACT OF THE DISCLOSURE

An optical viewing and observation apparatus comprising an objective lens system for forming an image on a photoelectrically sensitive layer pertaining to an image converter including a deformable layer which reflects the light from a light source prior to reaching a projection screen. A rotatable filter means is disposed in the ray path of the objective lens system and the light source to form colored images on the projection screen. A plurality of different photosensitive layers are interchangeable for response to the radiation from the objective lens system. Use of the apparatus corrects any distortions produced by the projection system.

---

The present invention relates to a viewing, observation or optical monitoring device particularly for the use in vehicles from which observation of the environment can be conducted only under rather severely impeded conditions. For example, armored cars, submarines or airplanes may be required to have only very small apertures in their respective shell or housing, restricting the observation field as far as direct observation of the environment from the interior of the vehicle is concerned. For reasons of safety, the provision of very small viewing slots may be mandatory which inherently results in a small aperture and such small openings, in turn, restrict the observation range.

One can use a telescopic type viewing device to be made movable to cover a wide observation field. If, however, the telescope provides for image enlargement, difficulties will be encountered in "fixing" the viewing field because of irregular motions of the vehicles. Even a stabilized mount for such a telescope is not completely satisfactory. In practice it is hardly possible to ensure that the eye of the viewer moves in conphase synchronism with the motion of the vehicle at all times, and a stabilizing control still has some delays. Thus, the viewer cannot expect to take a continuous "fix" on the observation field; it follows that during motion of the vehicle the viewer will observe the environment through such a telescope only intermittently. Additionally, it is of disadvantage that the eye of the viewer has to rest continuously against the eye piece of the telescope. This way the viewer may be able more fully to follow the stabilizing motion of the telescope but additional strain is introduced.

One could project the image of the telescope onto a screen, but in view of the aperture restriction at the optical input side of the telescope the resulting image brightness would be highly unsatisfactory, particularly because it would be inopportune to construct the system in such a manner that it requires always maximum brightness on the outside. It has been suggested to substitute the telescope by a closed circuit TV system, but such a system is highly sensitive to damage under the conditions it is presumed to operate.

It is an object of the present invention to obviate the above mentioned deficiencies and to provide a new observation or viewing apparatus and system. In accordance with the preferred embodiment of the invention it is suggested to provide a schlieren optic projector in which light from a separate light source is projected onto a screen but modulated prior to such projection by an electrostatic image converter controlling a deformable layer which, on one hand, reflects the light from the light source prior to reaching the projection screen and which, on the other hand, is locally deformable through an electrostatic field modulated in two dimensions through a photosensitive layer onto which an image from the environment is projected.

The image converter is comprised primarily of two portions. The first portion is a photo sensitive layer serving as a screen onto which an image of the environment is projected as stated. This photo sensitive layer is in a fact disposed in between two electrodes biased to different potentials. The resulting electrostatic field between the electrodes is a uniform one in any plane parallel to the electrodes and in the space in between the electrodes unless locally distorted by energization of the photo sensitive layer. This electrical field is modulated wherever photons increase the conductivity of the photo sensitive layer. Still in between the two electrodes there is a plastic layer which is deformable under the influence of an electrostatic field. As long as the electric field is uniform that layer will remain undeformed. Locally modulated radiation reaching the photo sensitive layer will result in local deformation. In order to provide correspondence between deformation and image, a raster is positioned in the optical input path of the photo sensitive layer.

The deformable layer constitutes a reflector in the schlieren projection system. The light from the auxiliary light source of the projection system is reflected by the deformable layer and that reflection is modulated in accordance with the local deformations. In addition it may be advisable to control the voltage between the electrodes in accordance with the actual average brightness of the images produced by the projection system.

The entire system will find its preferred use in vehicles in which, so to speak, the optical input conditions are rather restricted, but it is apparent that such a system can be used anywhere where the observation field has rather dim illuminating conditions and/or where an image is to be produced on a scale larger than could be observed by direct observation for several people. For example, TV and radar screen images can be intensified and enlarged. Several projectors can establish topographic views.

The projection can be a very bright one because the light amplification between optical input and optical output of the system depends primarily on the brightness of the light source used for the auxiliary schlieren optical projection system, and the intensity of that light source is, of course, independent from the illuminating conditions to be observed. The observation system can be made adjustable to accommodate different ambient illumination conditions and by selectively changing the sensitivity of the input side of at least the image converter. Of course, for the input processing of the input image there is provided, as mentioned above, a photo sensitive layer. However, different materials can be used here. Photo sensitive materials have specific frequency characteristics as between the electrical output and the optical input. Thus, for day observations a layer can be used which has its maximum sensitivity in the visible range of the electromagnetic wave spectrum whereas for twilight and night observations one can exchange it for a layer having substantial sensitivity in the infrared range.

In addition this system can be used for the purpose of providing color projection. Primary color filters are sequentially passed through the optical input of the system. In synchronism therewith similar filters are passed through the schlieren optical projection system. This principle can be extended by converting infrared input radiation into colored pictures. In case of infrared radiation as optical input for the system, IR filters of different transmission ranges are sequentially passed through the radiation path of the optical input of the system and red-green-blue filters are sequentially passed through the schlieren optic ray path, whereby a particular association is established between the different IR filters and the three visible light filters.

While the specification concludes with calims particularly pointing out and distinctly claiming the subject matter which is regarded as the invention, it is believed that the invention, the objects and features of the invention and further objects, features, and advantages thereof will be better understood from the following description taken in connection with the accompanying drawing, in which:

FIGURE 1 illustrates somewhat schematically the optical ray path for an image conversion and system in accordance with the preferred embodiment of the invention;

FIGURE 2 illustrates a supplementing modification of the system shown in FIGURE 1;

FIGURE 3 illustrates another modification of the system as shown in FIGURE 1;

FIGURES 3a and 3b illustrate filter disks usable in the embodiment of FIGURE 3; and FIGURE 4 illustrates an association pattern for color projection of an infrared optical input field.

Proceeding now to the detailed description of the drawings, in FIGURE 1, thereof there is indicated somewhat schematically a wall or shield 25 pertaining, for example, to the armoring of an armored car. An aperture, preferably a small aperture, in this armoring 25 provides for an optical path between the exterior and the interior of the car. A mirror 26 is mounted for rotation around a vertical axis and over the full range of 360° to scan the entire environment of the car. Mirror 26 reflects the radiation, coming from the object field in a generally horizontal direction, in a vertical direction to enter the interior of the armored car through the aperture in wall 25.

An objective lens or lens system 1 forms an image of the observation field. A grid plate 51 is disposed in an intermediate image plane of the objective system to introduce a raster modulation. Plate 51 may be a glass plate on which opaque strips have been deposited. The grating constant of the raster on plate 51 is preferably below the resolution of the eye with reference to the ultimate image to be produced by projection in a manner to be described below. For a coarser grid, means 52 may be provided to oscillate the plate 51 transversely to the optical axis of lens 1 as well as to the extension of the grid lines, and for an amplitude equal to the grating constant. The oscillation should be faster than discernible by a viewer, but the oscillation period must be longer than a particular time constant to be defined below.

There is no necessity as to a particular sequence of mirror 26 and objective lens system 1 in the optical path of interest. Thus, objective 1 may be mounted in front of mirror 26 and may thus be mounted for rotation therewith. Objective 1 may, for example, be a pancratic system permitting adjustment of the focal length of the objective so as to control the effective enlargement. Additionally or alternatively the objective 1 may include lens means for panorama observation.

A photoelectrically sensitive layer 2 pertaining to an image converter 3 is positioned in the main image plane of objective 1. The photo sensitive layer 2 is deposited on a transparent backing member 4, for example, a glass plate. A thin electrode 5 is interposed between the plate 4 and the layer 2. The electrode 5 is so thin that it is still to be regarded as transparent to a substantial degree; it is an electrically conductive layer biased to a particular electrical potential.

In optical alignment with the photo conductive layer 2 and the electrode 5 there is a glass plate 8 supporting an electrode 9 and a plastic layer 7. In between the assembly 2, 4, 5 and the assembly 7, 8, and 9 there is a spacing 6 which may be in communication with the atmospheric environment of the interior of the car.

The layer 7 is transparent and may be comprised, for example of silicones. The layer 7 has characteristics of deforming under the influence of an electric field, for example by electrostriction. The electrode 9 is similar to electrode 5, but biased to a different potential. The two electrodes 5 and 9 are thus electrically biased to establish an electric potential gradient or field across gap 6 and most importantly that field traverses layer 7.

A DC voltage source 10 is provided to generate the electric field. The voltage source 10 is, for example, connected with one terminal directly to one of the electrodes, here electrode 9, while the other terminal of source 10 connects to electrode 5 through a voltage regulator for controlling the strength of the electric field set up by the two electrodes. The regulator 12 has a controlling input provided by the output of a photo element 11. The source of the radiation reaching element 11 and the resulting control loop will be developed more fully below.

The image converter 3 is constructed to constitute the head of a schlieren optical projection system. The modulator here is particularly the layer 7. The schlieren system comprises an illumination source 13 and an optical projection system, the light path of which includes layer or member 7. A lens system 14 and 15 as well as mirrors 16 and 17 direct a parallel beam of light originating in source 13 onto the layer 7. The rays of that parallel beam are totally reflected by the surface of layer 7 bounding on space 6. As long as the layer 7 maintains uniform thickness throughout its extension, the rays remain parallel after reflection among themselves. The second portion of the projection system comprises a lens 18, mirrors 19 and 20, and an objective 21 for projection of an image onto a screen 22. That image is now produced as follows.

A first raster 23 defined by a grid of equidistantly spaced opaque and transparent lines preferably of equal width is interposed in the light path between the light source 13 and the layer 7. In particular now the lenses 15 and 18 form an imaging system for imaging the raster 23 onto a second raster 24 positioned at the object side of the projecting lens 21. The raster 24 is constructed and positioned so that the image of the raster 23 is projected onto the raster 24 in that the dark lines of the image of raster 23 are projected onto the transparent portions of the raster 24, and the bright image lines resulting from the transparent strips of raster 23 are projected onto the grid or raster bars of raster 24. This holds true only as long as the layer 7 is completely flat and undeformed. The lens or lens system 21 projects an image of the raster 24, with image of raster 23 superimposed, onto the screen 22. However, under the conditions presently discussed no light actually reaches screen 22.

The layer 7 has a completely flat configuration as long as the electric field between the electrodes 5 and 9 is a uniform one throughout the space 6. In view of the raster on grid plate 51 in the imaging path of lens 1, these conditions occur only when no or very little light reaches layer 2.

For an extreme bright object field with no contrast, layer 7 will be deformed in accordance with the raster pattern on plate 51. This locally variable deformation changes the angle of reflection regularly and also in a locally variable pattern, for the radiation from source 13 (lens 15). These regular local variations represent an image of the raster of grid plate 51. The spatial relation between the image of raster 23 and the raster 24 will now be disturbed locally. Wherever there is a disturbance, the image of a portion of raster 23 will be shifted relative to raster 24 to an extent commensurate with the disturbance.

A very bright object and image field modulated by the raster on plate 51 will thus produce extensive deformation of layer 7 and locally variable in accordance with the raster. Maximum brightness will appear on screen 22, where due to local deformation of layer 7 the image of a transparent raster line of raster 23 coincides with a transparent raster line of raster 24. This, however does not result in uniform brightness of the image on screen 22 because of the raster modulation from grid plate 51. These rasters as effective together in the image plane of screen 22 should be orthogonal to each other in order to avoid beat patterns to appear on the screen and the resulting image now is an array of bright but distinguishable dots, having uniformly maximum brightness. These dots become less pronounced if grid plate 51 oscillates.

Assuming now that the image of a contrasting object as observed by the lens 1 is projected onto the photoelectric layer 2, then the electric field across space 6 will appear to be modulated in a two-dimensional pattern corresponding to the image field as established by the objective 1. That modulation is superimposed upon the image of the raster of plate 51. This results in local variations of the electric field variations produced by raster on plate 51. The regular deformation of layer 7 as it would result from a modulation by the raster of plate 51 alone, is now disturbed in accordance with the locally variable image radiation resulting from a contrasting object field. This in turn results in such local variations of the reflection surface offered by layer 7 to the light from source 13, that the reflecting conditions as disturbed by the raster modulation are disturbed additionally in accordance with object field brightness and contrast variations thereof. It follows that the imaging conditions as outlined above and as established between the image of the raster 23 and the raster 24 for an undeformed or regularly deformed layer 7 now become locally disturbed to the extent that the above defined image dots on screen 22 have locally variable intensity. Thus, there appears on the screen 22 an image of the area field.

The overall or average brightness of the image projected on screen 22 is observed by this photoelement 11 controlling the voltage, applied to electrodes 5 and 9 and thus controls the magnitude of the electric field between the electrodes 5 and 9, which in turn determines the extent of permissible deformation of layer 7 for a given incremental brightness of an image point as produced on layer 2. If the light conditions of the external object field are highly unfavorable, then the control will be such that the voltage between the electrode 5 and 9 is rather high, and the overall electric field magnitude will be rather high. Thus, even low energizations of layer 2 cause material field changes and corresponding deformations in layer 7. A rather dim image as projected by the objective 1 into the image converter 3 will, therefore, still result in a sufficiently bright image on screen 22. The control loop for the regulator 12 is closed through the schlieren projector and the control operates towards a constant image brightness under variable ambient illumination conditions. As the ambient light conditions worsen, regulator 12 will reach its upper limit and thereafter the brightness of the image projected onto screen 22 will go down; this is, in turn, monitored by element 11. Thus, a signal is derivable either from element 11 or element 12 for signalling that the system has reached the limit for optimum projection performance.

It should be mentioned further that in the ray path of the projection beam of the schlieren projector there is provided a block 47 which may include a prism for example of the dove type and which is geared to the mirror 26 and caused to rotate therewith but at reduction ratio 2:1 in relation to the rotation of mirror 26. The purpose thereof will be understood from the following. Upon rotating mirror 26 the image produced by objective 1 rotates on layer 2 about the vertical axis. Without further measure the image as projected on screen 22 would likewise rotate, but now about a horizontal axis, so that only for one particular position of mirror 26 there would be an upright picture on screen 22. By using this rotating prism 47 and gearing it to the mirror 26 at the said ratio it is made possible to maintain an upright position of the image on screen 22 independently from the particular position the mirror 26 has at any instant. Devices of this type are known and do not require elaboration here.

The following additional equipment may be noted and can be regarded as being optionally included in block 47. If there is a panorama optic in objective system 1, there will be a corresponding corrective system in the projection system to produce wide screen type projection. Furthermore, the information which is image projected, and which is defined by the information of layer 7, is oriented obliquely to the incident radiation from lens 15. The resulting distortion can be corrected by using cylindrical lens means in the projection path.

FIGURE 2 illustrates another embodiment of the present invention in which there are two different units 27 and 28 mounted on a carriage 29 which is movable on a rail 30 by means of a rack and pinion arrangement which includes a pinion 31 driven by a motor M. The assemblies 27 and 28 each may comprise a unit composed of the elements 2, 4 and 5, as the desired exchange involves only the layer 2 and not the deformable member 7. Alternatively, however each unit may be a complete image converter, each including an assembly of elements 2, 4 to 9 as shown in FIGURE 1. Since the electrode spacing 6 in the electrostatic image converter is rather critical, it may be preferred to provide for an exchange of complete image converter-schlieren optic modulator assemblies each composed of a complete set of elements 2, 4 to 9; systems 27 and 28 are assumed to be so constructed. The purpose of the selector device illustrated is to place either the system 27 or the system optic 28 into the imaging ray path of the objective lens 1 as well as between the source 13 and the screen 22.

The two systems 27 and 28 have similar constructions except that their respective photo sensitive layers, corresponding to the layer 2 in FIGURE 1, have different spectral sensitivity. For example, the photo sensitive layer of the system 27 is sensitive primarily to radiation in the range of visible light, whereas the photo sensitive layer in system 28 has its maximum response in the IR range. For example PbS, $Sb_2S_3$ and other materials can be used here. This way the entire device can be rendered responsive selectively for day and night observations. For changing the signal can be received by an IR photoelement III and an electronic device 121.

The vehicle may additionally, for example, be equipped with a special infrared radiator III, illustrated in FIGURE 1 and directed towards the object field towards which mirror 26 is oriented, so as to illuminate the observation field with infrared radiation. The reflection is then observed in the manner as aforedescribed using now the infrared sensitive system 28. The motor M can be actuated from a control panel, from which the rotation of mirror 26, the focal length of system 1 and the infrared radiator for night observation can be controlled also.

FIGURE 3 illustrates how the inventive concept can be extended to provide a projection image on the screen 22 in natural colors. For example, a filter disk 32 is provided in the optical ray path between the objective lens 1 and the photo sensitive layer 2 of image converter 3. The illustration is schematic only, and preferably disk 37 will be in an intermediate image plane of objective system 1. Disk 32 and raster 51 may thus be in close proximity to each other. Disk 32 can be constructed as is schematically shown in FIGURE 3a or 3b. The disk 32 may have three different filter elements 33, 34 and 35 and respectively having peak transmittivity for the colors, blue, green and red.

The filters are placed into the imaging ray path of the objective lens 1 in repetitive sequence. The speed of the disk 32 is high enough so that the changes of the filters are individually not discernible by an observer. Again it should be mentioned, however, that the speed of the disk 32 cannot be excessively high due to certain lag in the deformability of layer 7. Thus, the period for which any particular filter element is in the optical path between lens 1 and converter 3 must not be shorter than the response delay of layer 7. In case grid plate 51 oscillates, care must be taken in the speed and frequency selections that one does not produce color beats.

Another disk similar to disk 32 and denoted with reference numeral 36, is positioned anywhere in the ray path between layer 7 and the projection screen 22. The two disks 32 and 36 rotate in phase and frequency synchronism in a manner which is known in the art. For example, they may be seated on a common shaft or they may be geared mechanically or electrically to each other. The linkage is representatively denoted with reference numeral 37.

The system as described thus provides sequential images in the primary colors to be projected onto screen 22 which will merge to appear as a colored image of the environment. The filter elements in disks 32 and 36 and having corresponding color transmittivity may not have identical color transmittance ranges, but may include corrective characteristics for the difference in the so-called color temperature of ambient daylight and of the light source 13, so as to arrive at an image in natural colors under daylight conditions.

The system as shown in FIGURE 3 is suitable basically for composing a color image or picture under daylight conditions, but alternatively this system is suitable also when combined with the modification of the system as shown in FIGURE 2; one can convert an IR image as provided by the objective 1 into a color image. For example, the disk 32 can be provided with three IR filters with respectively differing peak transmittivity in dependence upon wavelengths. For example, and as shown in FIGURE 4, there may be provided three IR filters having their transmittivity respectively in the ranges as indicated with reference numerals 41, 42 and 43 in FIGURE 4. It was found, that peak transmittivities of respectively 0.8, 1.2 and 1.8 microns produce excellent results. These ranges define the sensitivity ranges established by means of suitable IR filters for the sequential images as projected onto the photo sensitive layer 2 in system 28 which, of course, must be sensitive for all filter ranges used.

The disk 36 is again comprised of three filter sectors of the blue, green and red type. The phase relationship between the disk 32 and 36 is selected to provide a particular association between the infrared filters of the disk 32 and the blue-green-red filters of disk 36. This association established by phase synchronism of rotation of the two filter disks is schematically indicated by the arrows in FIGURE 4. The range of longest IR wavelength is associated with the red filter, the medium range IR radiation is associated with the green filter and the shortest IR radiation is associated with the blue filter.

The invention is not limited to the embodiments described above, but all changes and modifications thereof not constituting departures from the spirit and scope of the invention are intended to be covered by the following claims:

What is claimed is:
1. Optical viewing and observation apparatus comprising:
   first means including a plurality of differently sensitive photo sensitive layers, each for receiving a radiation field from an area to be observed and for providing a locally variable electrical signal;
   means for providing selective positioning of one of said layers for response to the radiation from the objective lens means;
   means responsive to the brightness of the area observed for controlling said selective positioning means;
   objective lens means responsive to radiation from the area observed and producing an image onto said one layer thereby providing a radiation field for locally variably energizing said one layer;
   a deformable member responsive to said locally variable electrical signal and undergoing correspondingly locally variable deformation; and
   a schlieren optic projection system including said deformable member and further including a light source and optical projecting means defining an optical path which includes said deformable member for providing an image of the deformation of said member.

2. Apparatus as set forth in claim 1 and comprising, in addition an IR radiator and means for controlling the radiator concurrently with said positioning means.

3. Optical viewing and observation apparatus comprising:
   means including a photo sensitive layer for receiving a radiation field from an area to be observed for providing a locally variable electrical signal;
   objective lens means responsive to radiation from the area observed and producing an image onto said layer thereby providing a radiation field for locally variably energizing said layer;
   a raster in the light path between the area under observation and said layer;
   means coupled to the raster for oscillatorily moving the raster perpendicularly to the light path;
   a deformable member responsive to said locally variable electrical signal and undergoing correspondingly locally variable deformation; and
   a schlieren optic projection system including said deformable member and further including a light source and optical projecting means defining an optical path which includes said deformable member for providing an image of the deformation of said member.

4. Optical viewing and observation apparatus, comprising:
   objective lens means for providing an image of an area to be observed;
   means responsive to said image and providing an electrical signal, which is locally variable in dependence upon contrasts in said image;
   a deformable member positioned to be responsive to said electrical signal to undergo correspondingly locally variable deformations;
   a schlieren optic projection system having an auxiliary light source and lens means to establish an optical path from the light source, the deformable member being oblique in said optical path as a reflector, the latter lens means providing an image representative of the deformations of the member; and
   means included in the projection system for correcting optical distortions resulting from said oblique position of said member.

5. Optical viewing and observation apparatus comprising:
   optical means including objective lens means for providing an image of an area to be observed;
   further including a schlieren optic projection system including a deformable layer and a light source positioned to project the light from the light source as modulated by deformations of the deformable layer into a projection plane;
   further including panorama optic means for respectively compressing and expanding the respective images for wide screen projection; and
   means responsive to the image as provided by the objective lens means and converting the locally variable image intensity into correspondingly locally variable deformations of the said deformable layer.

6. Optical viewing and observation apparatus, comprising:
   means including a photo sensitive layer for receiving a radiation field for providing a locally variable signal;
   means responsive to the brightness of the image as provided by the projection system for controlling the average magnitude of the electric field signal;

means responsive to said signal for providing a correspondingly locally variable electrostatic field;

a deformable member positioned in said electrostatic field and undergoing correspondingly locally variable deformations;

objective lens means responsive to radiation from the area to be observed and producing an image onto said layer thereby providing a radiation field for locally variably energizing said layer;

a schlieren optic projection system including said deformable member and further including a light source and optical projecting means defining an optical path which includes said deformable member for providing an image of the deformation of said member.

7. Optical viewing and observation apparatus, comprising:

optical lens means for providing an image of an area to be observed;

first rotating filter means having a plurality of different filters sequentially passed through the imaging ray path as provided by the lens means;

a schlieren optic projection system including a light source and a deformable layer for modulating the light from the light source in accordance with deformations of the deformable layer and including means for the projection of an image corresponding to the modulation of the light from the light source by the deformable layer;

second rotating filter means having a plurality of different filters sequentially passing through the light as projected by the projection means, and in synchronism with the rotation of the first filter means; and means responsive to the radiation forming the image as provided by the lens system and as filtered by the first filter means for converting the locally variable intensity of the radiation forming the latter image into correspondingly locally variable deformations of said layer.

8. Apparatus as set forth in claim 7, said second filter means comprising three filters with respective blue, green and red transmittivity.

9. Apparatus as set forth in claim 8, said first filter means comprising three filters with respective blue, green and red transmittivity.

10. Apparatus as set forth in claim 9, said second filters being corrected as to different color temperature of the observation field and the light source.

11. Apparatus as set forth in claim 8, said first filter means comprising three filter elements of different infrared transmittivity, the synchronism of the first and second filter means being such that for the blue, green and red filters of the second filter means when respectively in the ray path of the light as projected, the filter elements of the first means and as effective in the ray path of the lens means are changed corresponding to a transmittivity range change from shorter to longer wavelengths.

12. Apparatus as set forth in claim 9, said first filter means comprising three filters having peak transmittivity at .8, 1.2 and 1.8 microns respectively.

13. Apparatus as set forth in claim 7, said first and second filter means being driven in unison.

References Cited

UNITED STATES PATENTS

| 3,001,447 | 9/1961 | Ploke | 350—161 |
| 3,137,762 | 6/1964 | Baumgartner et al. | 350—161 |
| 3,385,927 | 5/1968 | Hamann | 178—7.87 |

FOREIGN PATENTS 778,376  7/1957  Great Britain.

NORTON ANSHER, Primary Examiner

R. M. SHEER, Assistant Examiner

U.S. Cl. X.R.

350—161; 353—66; 355—68